Oct. 1, 1957  H. O. SCHERENBERG  2,808,038
CONTROL SYSTEM FOR AN INTERNAL COMBUSTION PISTON
ENGINE, PARTICULARLY FOR MOTOR VEHICLES
Filed March 23, 1954  2 Sheets-Sheet 1
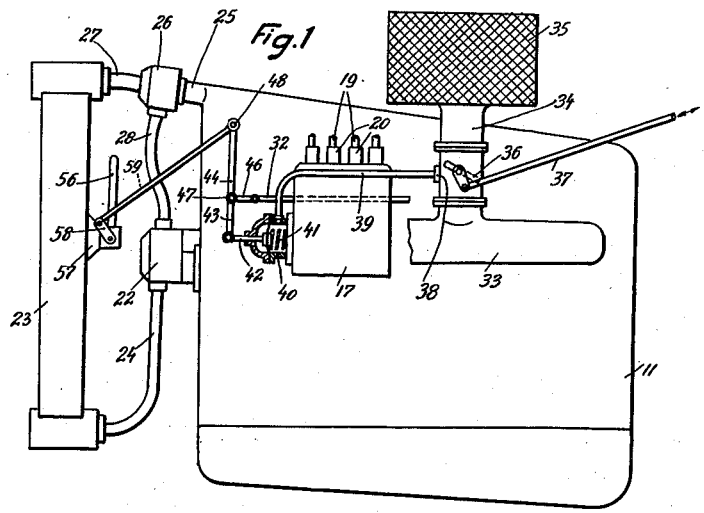
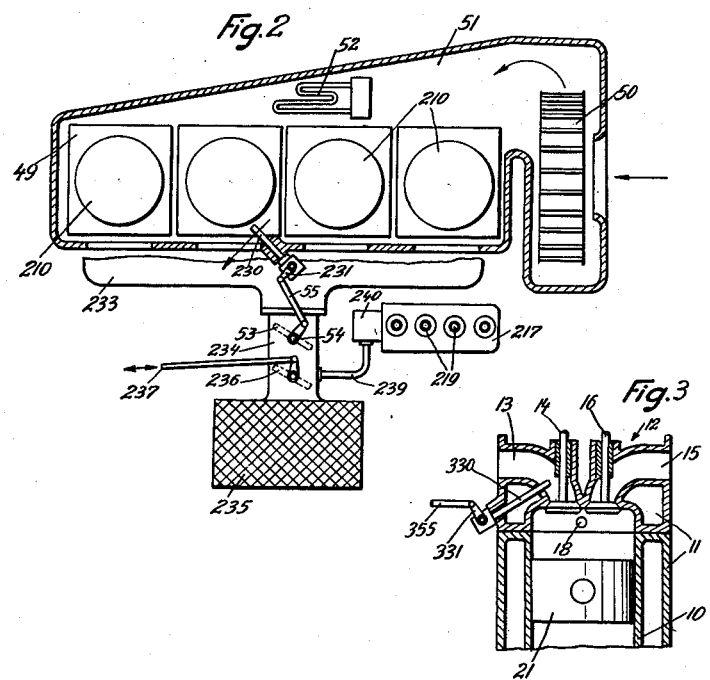
INVENTOR.
HANS O. SCHERENBERG.
BY Dicke and Craig.
ATTORNEYS.

Oct. 1, 1957  H. O. SCHERENBERG  2,808,038
CONTROL SYSTEM FOR AN INTERNAL COMBUSTION PISTON
ENGINE, PARTICULARLY FOR MOTOR VEHICLES
Filed March 23, 1954  2 Sheets-Sheet 2
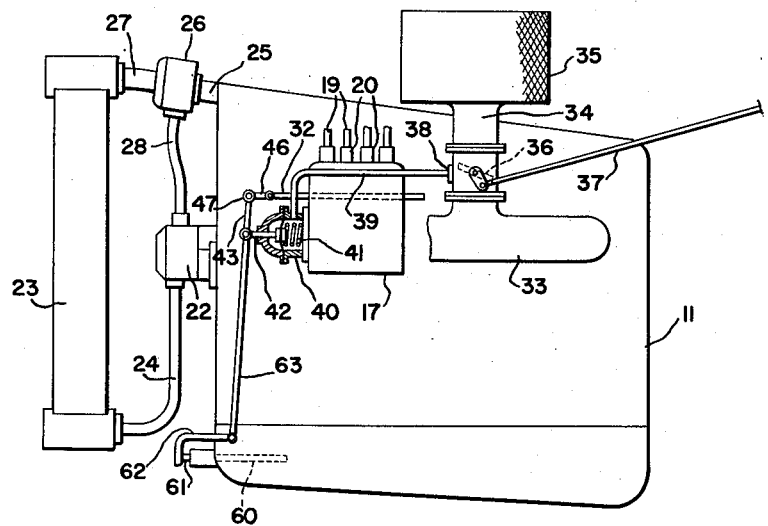
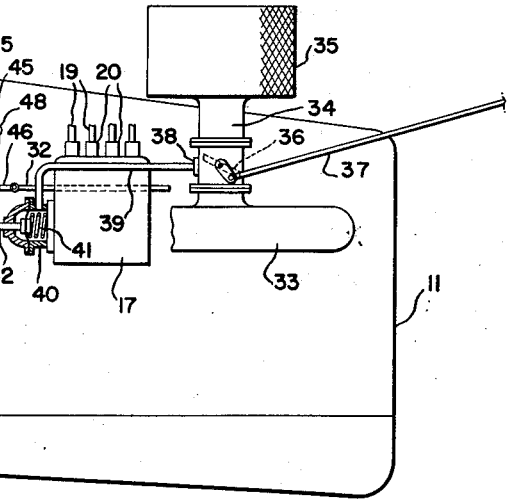
INVENTOR
HANS O. SCHERENBERG
BY Dicke and Craig
ATTORNEYS.

United States Patent Office 2,808,038
Patented Oct. 1, 1957

2,808,038

CONTROL SYSTEM FOR AN INTERNAL COMBUSTION PISTON ENGINE, PARTICULARLY FOR MOTOR VEHICLES

Hans O. Scherenberg, Stuttgart-Heumaden, Germany, assignor to Daimler-Benz Aktiengesellschaft, Stuttgart-Unterturkheim, Germany Application March 23, 1954, Serial No. 418,192

Claims priority, application Germany April 2, 1953

3 Claims. (Cl. 123—41.1)

The present invention relates to internal combustion piston engines of the type adapted to compress a fuel-gas-mixture produced by a fuel pump injecting the fuel into a stream of air admitted to the cylinder for subsequent compression and ignition by a spark plug. More particularly, the invention relates to a control system for such an internal combustion piston engine.

In machines of this kind, part of the fuel will condense on the walls of the intake duct and of the cylinder when the engine is cold, whereby the air-fuel-ratio in the mixture is rendered so lean that the ignition is adversely affected. Hence, it is difficult to start the engine in cold condition.

It is the primary object of the present invention to provide an improved control system whereby the fuel-air-ratio in the mixture may be kept substantially constant irrespective of the variations of the temperature, thus facilitating the starting operation.

A further object is the provision of a single temperature-responsive element for controlling both the ratio of the air-fuel-mixture compressed by the piston or pistons and the cooling circuit of the engine provided to cool the cylinders and/or the lubricating oil of the engine.

Further objects of the present invention will appear from the description following hereinafter of a number of embodiments of the invention. However, it is to be clearly understood that such description serves the purpose of illustrating the invention rather than the purpose of restricting the same, the features of novelty being defined in the accompanying claims. In the drawings, Fig. 1 is a side view of an internal combustion piston engine provided with a fuel pump, a cooling circuit including a radiator and a thermostat responsive to the temperature of air passing through the radiator for controlling the pump, parts of the latter being shown in section, Fig. 2 is a more or less diagrammatic horizontal section taken through an air-cooled four-cylinder internal combustion engine provided with an injection pump and with a thermostat controlling the air-fuel-ratio of the mixture, such thermostat being mounted to respond to the temperature of the cooling air, Fig. 3 is an axial section taken through a cylinder of an internal combustion piston engine of the type provided with a thermostat adapted to control the air-fuel-ratio of the combustible mixture compressed in the cylinder, such thermostat responding to the temperatures of the cooling medium and of the air flowing through the intake, Figure 4 is a view similar to that of Figure 1 but showing a thermostat responsive to the temperature of the lubricating oil in the control pan for controlling the pump, and Figure 5 is a view similar to that of Figure 1 but showing a thermostat responsive to the temperature of the water in the cooling water system for controlling the pump and the cooling circuit.

The internal combustion piston engine comprises a cylinder block 10 including four cylinders provided with a cooling jacket 11 and with a cylinder head 12 which for each cylinder has an intake duct 13 controlled by an intake valve 14 and an outlet duct 15 controlled by an outlet valve 16. A fuel pump 17 is geared to the customary cam shaft not shown that actuates the valves 14 and 16, and each cylinder is equipped with an injection device 18 connected by a pipe 19 to one of the four outlets 20 of the pump 17, the latter being so timed as to feed the fuel to the injection device 18 when intake valve 14 is open and air is sucked through intake 13 into the cylinder 10 by the piston 21. The pistons 21 actuate the customary crankshaft which is geared to the cam shaft above referred to. After the reciprocatory piston 21 has descended and sucked the mixture charge into the cylinder 10, the piston 21 will then compress such charge for subsequent ignition by a spark plug not shown.

In internal combustion piston engines of this type it is desirable that the air-fuel-ratio in the mixture should be kept at its most favorable value, irrespective of the changes of the temperatures of the engine and of the air sucked into the intake 13. Engines of the type to which this invention relates are usually provided with one or more auxiliary fluid circuits, such as a circuit containing a fluid in heat transfer relationship with the engine. Such auxiliary fluid is thereby responsive and the temperature thereof is proportional to the engine temperature, the auxiliary fluid effecting cooling of the engine to a greater or lesser degree, examples being a circuit of a cooling liquid and/or a circuit of a lubricant. Thus, the engine indicated in Figs. 1, 4 and 5 is provided with a pump 22 which circulates cooling water sucked from the bottom of a radiator 23 through a pipe 24 and fed through the cooling jaacket 11 of the cylinder block, whence it is returned through a pipe 25, a valve housing 26 and a pipe 27 to the top of the radiator 23. The pump is connected with the housing of valve 26 by a bypass pipe 28 adapted to shortcircuit the radiator 23 when it is desired to disable the cooling circuit. The valve housing 26 may contain a valve member 29 indicated in Fig. 5 by dotted lines which is so movable as to throttle either pipe 27 or pipe 28 depending on its angular adjustment, the latter being effected by rotation of a shaft 30 having an arm 31. In the valve housing 26 shown in Fig. 5 a temperature-responsive device in form of a bi-metal thermostat is so mounted as to turn shaft 30 upon expansion in anti-clockwise direction when the temperature rises. When the engine is cold pipe 27 is closed by valve member 29, while pipe 28 is open. Therefore, the pump will circulate the cooling liquid through 28 where it is not substantially cooled. As soon as the temperature reaches the degree desirable for normal operation, the valve member 29 closes pipe 28 and opens pipe 27 whereupon pump 22 will circulate the fluid through the radiator 23. Since thermostat-controlled valves, such as valve 26, for the control of radiatiors are well known and available on the market, a detailed description thereof is deemed dispensable herewith.

For the purpose of maintaining the air-fuel-ratio in the mixture compressed by piston 21 as nearly constant as possible, the following means are provided:

The pump 17 has a control member in form of a shiftable plunger 32 which by its position determines the quantities of fuel intermittently fed by the pump through the pipes 19 to the injection devices 18 of the cylinders. The intakes 13 of the different cylinders are connected with an intake manifold 33 connected by an inlet duct 34 to an air filter 35. A throttle in form of a butterfly valve 36 is mounted in the inlet duct 34 and is adjustable by a suitable linkage 37 connected to an accelerator pedal. The throttle 36 by its adjustment determines the weight of the air charge admitted to the cylinders. In order to control the quantities of fuel injected in proportion to such air charges, the inlet duct 34 is tapped at a point 38 and connected by a pipe 39 to a diaphragm chamber 40 forming part of pump 17, the diaphragm of such chamber being biased by a spring 41 contrary to the effect of the vacuum and connected by a rod 42 with the lower arm 43 of a two-armed lever. The upper arm 44 of such lever is connected by a link 45 to arm 31 of the shaft 30. The adjustable control plunger 32 is connected by a link 46 to the fulcrum 47 of the lever 43, 44.

The device operates as follows:

When the throttle 36 is moved towards its closed position thereby reducing the weight of the air charge, vacuum is produced in the intake manifold 33 and transmitted by pipe 39 to the diaphragm chamber 40 pulling the diaphragm and rod 42 to the right. As a result, plunger 32 is shifted to the right thereby reducing the quantities of fuel intermittently injected into the cylinders by the pump 17.

As shown in the embodiment of Fig. 5, a similar reduction of the fuel charges injected will be obtained by an increase of the temperature of the cooling liquid owing to rotation of shaft 30 in anti-clockwise direction causing link 45 to be moved to the right, such movement being transferred by two-armed lever 43, 44 through link 46 to plunger 32.

The position of the rod 42 will correspond at any time to the degree of vacuum prevailing at the tapping point 38 which, in its turn, depends on the position of the throttle valve 36 and thus the weight of the air charges sucked into the cylinders by pistons 21.

Regarding pivot 48 between lever arm 44 and link 45 stationary for the purpose of explanation, the plunger 32 will be moved to differential positions by the lever 43, 44 and link 46, the arrangement being such that the required fuel quantity is allotted to any weight of the air charges sucked into the cylinders. The temperature-responsive regulation is superimposed on the vacuum-controlled regulation of the fuel quantity, since the arm 31 assumes different positions depending on the temperature of the cooling liquid. Movement of arm 31 is likewise transferred to the control plunger 32 by the lever 43, 44 and the link 46, the arrangement being such that the fuel quantity will be increased by a clockwise rotation of shaft 30 causing less cooling liquid to circulate through the radiator 23.

From the above description it will be evident that the plunger 32 is an adjustable regulating element operative in dependence on its position to variably determine the ratio of fuel and air of the combustible gaseous mixture compressed by piston 21 prior to its ignition by a spark plug not shown, and that the linkage 43 to 46 represents motion-transmitting means connecting the adjustable regulating element 32 with the temperature-responsive device mounted in valve casing 26 to respond to the temperature of the fluid in the auxiliary fluid circuit 23, 24, 22, 11, 25, 26, 27.

Fig. 2 illustrates the application of the present invention to an air-cooled four-cylinder engine in which cooling air is circulated by a ventilator 50 past the row of cylinders 210 provided with the usual cooling ribs 49. The air passes through a chamber 51 and, on its way through this chamber, serves to cool a pipe coil 52 through which lubricating oil of the engine is circulated. The air heated by both the lubricant pipe coil 52 and the ribs 49 of the cylinders 210 passes over a temperature-responsive device 230 adapted upon expansion to rotate an arm 231 anti-clockwise. Since such temperature-responsive devices are well known in the art and available on the market, a detailed description thereof is deemed dispensable. The intake manifold 233 of the engine is connected with an intake duct 234 in which a throttle valve 236 is mounted for adjustment through a linkage 237 by the usual accelerator pedal. The air enters the intake duct 234 through a filter 235. The cylinders 210 are provided with injection devices similar to device 18 and with spark plugs for ignition of the mixture. The pump 217 which is geared to the engine as described hereinabove with reference to pump 17, is controlled in the same manner as the latter, the vacuum chamber provided for this purpose being indicated at 240. However, in this instance, the controlling plunger 32 determining the fuel charges intermittently fed by the pump 217 through the pipes 219 to the fuel injection devices is directly connected with the diaphragm in the diaphragm chamber 240. When the driver releases the accelerator pedal to close throttle 236, the vacuum thus produced will be transferred from the inlet duct 234 through pipe 239 to the diaphragm chamber 240 causing the diaphragm to move to the right and to thereby shift the control plunger not shown accordingly.

In this embodiment, the air-fuel-ratio is influenced by an auxiliary throttle valve 53 disposed in the inlet duct 234 between the intake manifold 233 and the main throttle valve 236. This auxiliary throttle valve 53 has a shaft 54 extending to the outside of duct 234 and having an arm connected by a link 55 to the arm 231 of the thermostat, the arrangement being such that when the temperature of the thermostat drops, the arm 231 turning clockwise will move the auxiliary throttle 53 towards its closed position thereby reducing the air charge.

The position of the auxiliary throttle 53, however, has little or no effect upon the vacuum prevailing in pipe 239 and, therefore the quantity of fuel injected will not be affected by the variation of the air charge.

When during the starting operation the engine is in cold condition, the cooling air circulated through the engine by the ventilator 50 is likewise cold when contacting the thermostat 230. Therefore, the auxiliary throttle valve 53 will be held in a throttling position in which it is more or less closed. This means that a restricted volume of air only will be sucked into the cylinders of the engine, irrespective of the position of the main throttle 236. The driver, however, may so adjust the main throttle as to cause the vacuum prevailing in chamber 240 to collapse whereby the controlling plunger corresponding to plunger 32 will be moved to the left causing the pump to inject large quantities of fuel into the cylinders resulting in a fat mixture, such as desired in the starting operation. As the engine warms up the auxiliary throttle 53 is gradually opened.

In Fig. 3 an alternative arrangement of the thermostat is illustrated which may be used with the control arrangement of Figs. 1, 2, 4 or 5. In this embodiment, the thermostat 330, which may be substituted for example, for any of the thermostatic elements of Figs. 1, 4 or 5 or for thermostat 230 in Fig. 2, is so mounted as to be in contact with both the auxiliary cooling medium, such as the cooling air or the cooling water circulating through jacket 11 and with the air passing through the intake 13. For that purpose, the temperature-sensitive portion 330 of the thermostat passes through the outer wall of the cooling jacket and through the wall of the intake 13. Therefore, the temperature-responsive device responds to the temperature of the cooling liquid and to that of the combustion air. As a result, the linkage 355 connecting the temperature-responsive device with the auxiliary throttle or other suitable ratio-controlling element will act to control the ratio of mixture in dependence on the temperature of the engine and on the temperature of the combustion air.

In Fig. 1 I have indicated a temperature-responsive device 56 mounted on a bracket 57 fixed to the inside of the radiator. As a result, the device 56 will respond to the temperature of the air that has passed through and has been heated by the radiator. The device 56 when heated will turn an arm 58 in clockwise direction. This arm may be connected with arm 44 by a link 59.

In the embodiment of Fig. 4, a bi-metal thermostat 60 may be so mounted as to measure the temperature of the lubricating oil in the control pan of the engine. Upon expansion of the temperature, the movable end 61 of the device 60 will move to the left. The end 61 has an extension 62 which may be connected to the lower arm 63 of a two-armed lever. This lever may be fulcrumed on rod 42 and its upper, shorter arm may be connected to link 46. In this event, the part 43 constitutes this upper arm. In operation, both an increase of the temperature of the lubricating oil and an increase of the vacuum will cause pump 17 to reduce the quantity of fuel injected.

By the temperature-responsive control of the ratio of the air-fuel-mixture the starting of the engine is considerably facilitated, since the quantity of fuel injected will be larger when the engine is in a cold condition thus ensuring that the ratio of mixture will be such as required for a reliable ignition. In all embodiments the temperature-responsive device is operative to increase the fuel quantity in relation to the weight of the air charge when the auxiliary fluid, such as cooling air or cooling water, has a low temperature indicative of the cold condition of the engine. The temperature-responsive device may be mounted in direct contact with the cooling liquid or the cooling air, or it may be contacted by the air that has passed through and been heated by the radiator or the cooling coil for the lubricant. The disposition of the thermostat in the air stream as shown at 56 in Fig. 1 involves the advantage that a leakage is avoided, such as may occur where the thermostat is mounted in contact with the cooling water.

In the embodiment shown in Fig. 5 the temperature-responsive device is operative at the same time to control the temperature of the cooling liquid circulating through the engine and the ratio of mixture. Where the radiator of an internal combustion engine is provided with a bypass pipe, such as pipe 28 in Fig. 5, controlled by a thermostat, such thermostat may be used at the same time to control the ratio of mixture so that an additional temperature-responsive device may be dispensed with.

Variations of the temperature of the combustion air passing through intake 13 result in variations of the air charge measured by weight. Where the air is cold, a heavier charge will be sucked into the cylinder than with a higher air temperature. Therefore, the ratio of air and fuel in the mixture requires a correction corresponding to the specific gravity of the air in order to ensure an economical operation. This object is achieved by rendering the control dependent upon the temperature of the combustion air, as shown in Fig. 3, in addition to the temperature of the auxiliary fluid circuit. This is the reason why in Fig. 3 the thermostat 330 has been so provided as to respond to both the temperature of the air passing through intake 13 and to the temperature of the liquid passing through jacket 11.

While I have described my invention with reference to a number of preferred embodiments thereof, I wish it to be clearly understood that the same is in no way limited to the details described, but is capable of numerous modifications within the scope of the appended claims.

What I claim is:

1. In an internal combustion piston engine of the type adapted to compress a fuel-gas-mixture of which the fuel is injected by a fuel pump prior to the ignition of the mixture by a spark plug, the combination comprising a cooling circuit for said engine including a radiator, a by-pass pipe adapted to short-circuit said radiator, a valve controlling the communication between said bypass pipe and said cooling circuit, an adjustable regulating element operative in dependence on the position thereof to variably determine the quantity of the injected fuel, a suction duct for the combustion air, throttle means in said suction duct, a chamber including a movable member for sealing said chamber in air-tight relation, a further duct connecting said chamber with said suction duct, link means operatively connecting said movable member with said adjustable regulating element, a temperature-responsive device responsive to the temperature of the cooling liquid circulating in said cooling circuit, and motion-transmitting means operatively connecting said temperature-responsive device with said link means, said motion-transmitting means being further operatively connected with said valve.

2. In an internal combustion piston engine of the type adapted to compress a fuel-gas mixture of which the fuel is injected by a fuel pump prior to the ignition of the mixture by a spark plug, the combination comprising a cooling circuit for said engine including a radiator and a control element for controlling said cooling circuit, an adjustable regulating element operative in dependence on the position thereof to variably determine the quantity of the injected fuel, a suction duct for the combustion air, throttle means in said suction duct, a chamber including a movable member for sealing said chamber in air-tight relation, a further duct connecting said chamber with said suction duct, link means operatively connecting said movable member with said adjustable regulating element, a temperature responsive device responsive to the temperature of the cooling liquid circulating in said cooling circuit, and motion transmitting means operatively connecting said temperature responsive device with said link means, said motion transmitting means being further operatively connected with said control element.

3. In an internal combustion piston engine of the type adapted to compress a fuel-gas mixture of which the fuel is injected by a fuel pump prior to the ignition of the mixture by a spark plug, the combination comprising an adjustable regulating element operative in dependence on the position thereof to variably determine the quantity of the injected fuel, a suction duct for the combustion air, throttle means in said suction duct, a chamber including a movable member for sealing said chamber in air-tight relation, a further duct connecting said chamber with said suction duct, link means operatively connecting said movable member with said adjustable regulating element, means on said engine forming a circuit accommodating a fluid in heat transfer relationship with said engine the temperature of which is proportional to the engine temperature, a temperature-responsive device responsive to the temperature of said fluid, and motion-transmitting means operatively connecting said temperature responsive device to said link means.

References Cited in the file of this patent

UNITED STATES PATENTS

| | | |
|---|---|---|
| 1,895,534 | Blood | Jan. 31, 1933 |
| 2,213,683 | Banning | Sept. 3, 1940 |
| 2,435,902 | Reggio | Feb. 10, 1948 |
| 2,622,572 | Nallinger | Dec. 23, 1952 |